United States Patent [19]
Sunaga et al.

[11] Patent Number: 5,918,501
[45] Date of Patent: Jul. 6, 1999

[54] SHEET METAL DRAWING TOOL AND METHOD FOR REPAIRING SHEET METAL

[75] Inventors: Hideo Sunaga; Yoshitake Fukushima, both of Kodama-gun, Japan

[73] Assignee: Kabushiki Kaisha, Japan

[21] Appl. No.: 09/050,701

[22] Filed: Mar. 30, 1998

[51] Int. Cl.[6] .................................................. B21J 13/02
[52] U.S. Cl. ........................... 72/479; 72/481.8; 72/705; 219/86.21
[58] Field of Search .................................. 72/391.2, 450, 72/705, 479, 481.3, 481.8; 29/254; 219/98, 99, 86.21

[56] References Cited

U.S. PATENT DOCUMENTS

| | | | |
|---|---|---|---|
| 3,801,772 | 4/1974 | Curcio et al. | 72/705 |
| 4,924,056 | 5/1990 | Bevilacqua | 219/98 |
| 5,333,486 | 8/1994 | Ishihara | 72/705 |
| 5,516,997 | 5/1996 | Hunter | 72/705 |
| 5,541,381 | 7/1996 | Galbraith et al. | 219/86.21 |

FOREIGN PATENT DOCUMENTS 8-29343   3/1996   Japan .

*Primary Examiner*—Joseph J. Hail, III
*Assistant Examiner*—Ed Tolan
*Attorney, Agent, or Firm*—Oldham & Oldham Co., L.P.A.

[57] ABSTRACT

The invention provides a tool and method for repairing a sheet metal according which a dented portion of a sheet metal can be easily and appropriately pulled out with a minimal force. The tool has a simple structure and adapted to be used in the method. The tool includes an end of an operation shaft 1 having a given length serves as a handle portion 2, and an arc electrode 3 is affixed to the other end. A support stand 4 is attached to an end of the operational shaft 1. The support stand 4 may include a base 5 through which the operational shaft 1 is inserted and affixed thereto, a leg portion 6 extended from the base 5, and a seat portion 7 attached to the lower end of the leg portion 6. With the configuration as above, the arc electrode 3 is welded to a dented portion r of a sheet metal while the seat portion 7 is in contact with the sheet metal surface R, and the operation shaft 1 is tilted in that state, while the seat portion 7 is pressed against the sheet metal surface R. Thus, the dented portion r joined to the arc electrode 3 is pulled out by leverage.

13 Claims, 9 Drawing Sheets

5,918,501

SHEET METAL DRAWING TOOL AND METHOD FOR REPAIRING SHEET METAL

TECHNICAL FIELD

The present invention relates to a sheet metal drawing tool typically used for repairing the body of an automobile and a method of repairing a sheet metal. The invention particularly relates to a sheet metal drawing tool which is lightweight and handy and is capable of pulling out a dented portion of the body of the automobile or the like easily and appropriately. The invention also relates to a method for repairing a sheet metal by using such a tool.

BACKGROUND OF THE INVENTION

In cases where the body of an automobile has been deformed due to a collision or other reasons, the repair is usually done by either pounding out the dented portion from inside or pulling said portion from outside. However, as the method which calls for pounding out the portion from inside calls for removal of interior equipment prior to the repair, the operation is troublesome and takes a lot of time. Therefore, the method which calls for pulling out dented portions from outside is usually employed.

An example of conventional tools for this purpose, a sheet metal drawing tool disclosed in Japanese Patent Publication No. 29343/1986 is widely known. Referring to FIG. 10, the sheet metal drawing tool has at one end thereof a shaft B which is often called a bit and provided with an arc electrode A. The shaft B is attached to a casing D having a pair of levers C so that the shaft B works in the longitudinal direction by means of operating the levers C. The sheet metal drawing tool functions in such a manner that a dented portion of a sheet metal can be pulled out by connecting the power supply portion of a welding machine to a part of the shaft B via a cable E, flowing electric current to the arc electrode A, thereby welding the end of the electrode to the portion of the sheet metal, and operating the levers C in that state to pull up the shaft B in the direction along its length.

In order to pull up the electrode, it is common practice performed in such an occasion that the operation shaft having the electrode at its end is pounded upward with a hammer in fractional actions so that the impact of the pounding pulls up the dented metal portion with the electrode therebretween.

One of the methods widely employed for pounding an operation shaft with a hammer calls for providing a hammer with an insertion hole, inserting an operation shaft through the hammer, and hitting the operation shaft by sliding the hammer along the shaft. This method is very convenient, because the operation shaft can be hit precisely at desired locations with a desired amount of force simply by pulling the hammer upward without any complicated operation.

However, if the hammer is permanently attached to the operation shaft, such a structure is inconvenient in that it is necessary to carry or handle the tool always together with the hammer whenever the tool is transported or in other occasions where the hammer is not needed.

In order to overcome this problem, the applicants of the present invention had previously offered an invention (Japanese Application No. 84120/1997) wherein a hammer is removably attached to an operation shaft. Said previous invention, however, calls for providing a hammer at its open portion with teeth, and providing the operation shaft with indented portions adapted to respectively receive the teeth therein, wherein fitting and removal of the hammer may be done only at these portions where the teeth are engaged in or removed from the indented portions.

SUMMARY OF THE INVENTION

However, the aforementioned conventional sheet metal drawing tool shown in FIG. 10 presents problems in that its structure is very complicated and expensive to produce because it requires a mechanism to move the shaft and that the tool is inconvenient to handle, because it is heavy in weight and requires a large number of parts. Furthermore, in order to pull out the sheet metal, it is necessary to pull up the shaft in the direction along its length by operating the levers against the tension of the sheet metal and the elastic force of springs F, G. As such an operation requires a considerable force of action and impose a heavy work on the operator, it is inevitable that the operator will suffer from fatigue in the arms and decrease in grasping power in the course of repetition of operation.

In addition, in order to attach the hammer to the operation shaft, some work has to be done to the operation shaft. In case of the aforementioned previous invention, the work involves forming of indented portions. This presents the danger of reducing the strength of the operation shaft, which may result in poor operational performance. Furthermore, the tool is inconvenient to use because the access of the hammer is limited to only one location.

Therefore, an object of the present invention is to provide a method for repairing a sheet metal according which a dented portion of a sheet metal can be easily and appropriately pulled out with a minimal force and also to provide a tool having a simple structure and adapted to be used for said method.

Another object of the invention is to provide a configuration wherein the slide hammer is removably attached to the operation shaft; the operation shaft can be used as it is without processing so that there is no danger of decrease in the strength; and wherein the hammer can be attached or removed in any circumstances.

In order to attain the above object, the invention provides a sheet metal drawing tool including an operation shaft and a support stand attached to the operation shaft, the operation shaft having an end that serves as a handle portion and the other end that is provided with an arc electrode adapted to be welded to a portion of a sheet metal, wherein the support stand has a seat portion which is located near the arc electrode and adapted to be brought into contact with the surface of a sheet metal so that the portion of the sheet metal that is joined to the arc electrode can be pulled out by tilting the operation shaft while pushing the seat portion against the surface of the sheet metal.

A more specific embodiment of the present invention includes an operation shaft and a support stand attached to the operation shaft, the operation shaft having an end that serves as a handle portion and the other end affixed to a part of said support stand, the support stand being composed of a base for securing the operation shaft at one end thereof, a leg portion extended from the other end of the base along the operation shaft, and a seat portion provided at the lower end of the leg portion, wherein either the operation shaft or the base is provided with an arc electrode which is located near the seat portion and adapted to be welded to a potion of a sheet metal so that the portion of the sheet metal that is joined to the arc electrode can be pulled out by tilting the operation shaft while pushing the seat portion against the surface of the sheet metal.

According to a particular feature of the invention, the operation shaft and the support stand can be moved relative to each other along the length of the operation shaft; the seat portion is so attached to the leg portion of the support stand as to be capable of swinging; brims are formed on the operation shaft with a predetermined distance between the brims; and a slide hammer is attached to the portion between the brims in such a manner that the slide hammer is capable of sliding in the direction along the length of the operation shaft.

Furthermore, the present invention also provides a method for repairing a sheet metal, said method calling for using a sheet metal drawing tool including an operation shaft and a support stand attached to the operation shaft, the operation shaft having an end that serves as a handle portion and the other end that is provided with an arc electrode adapted to be welded to a portion of a sheet metal, wherein the support stand has a seat portion that is located near the arc electrode and adapted to be brought into contact with the surface of a sheet metal, and wherein the portion of the sheet metal that is joined to the arc electrode can be pulled out by tilting the operation shaft while pushing the seat portion against the surface of the sheet metal.

DETAILED DESCRIPTION OF THE INVENTION

Figure 1:
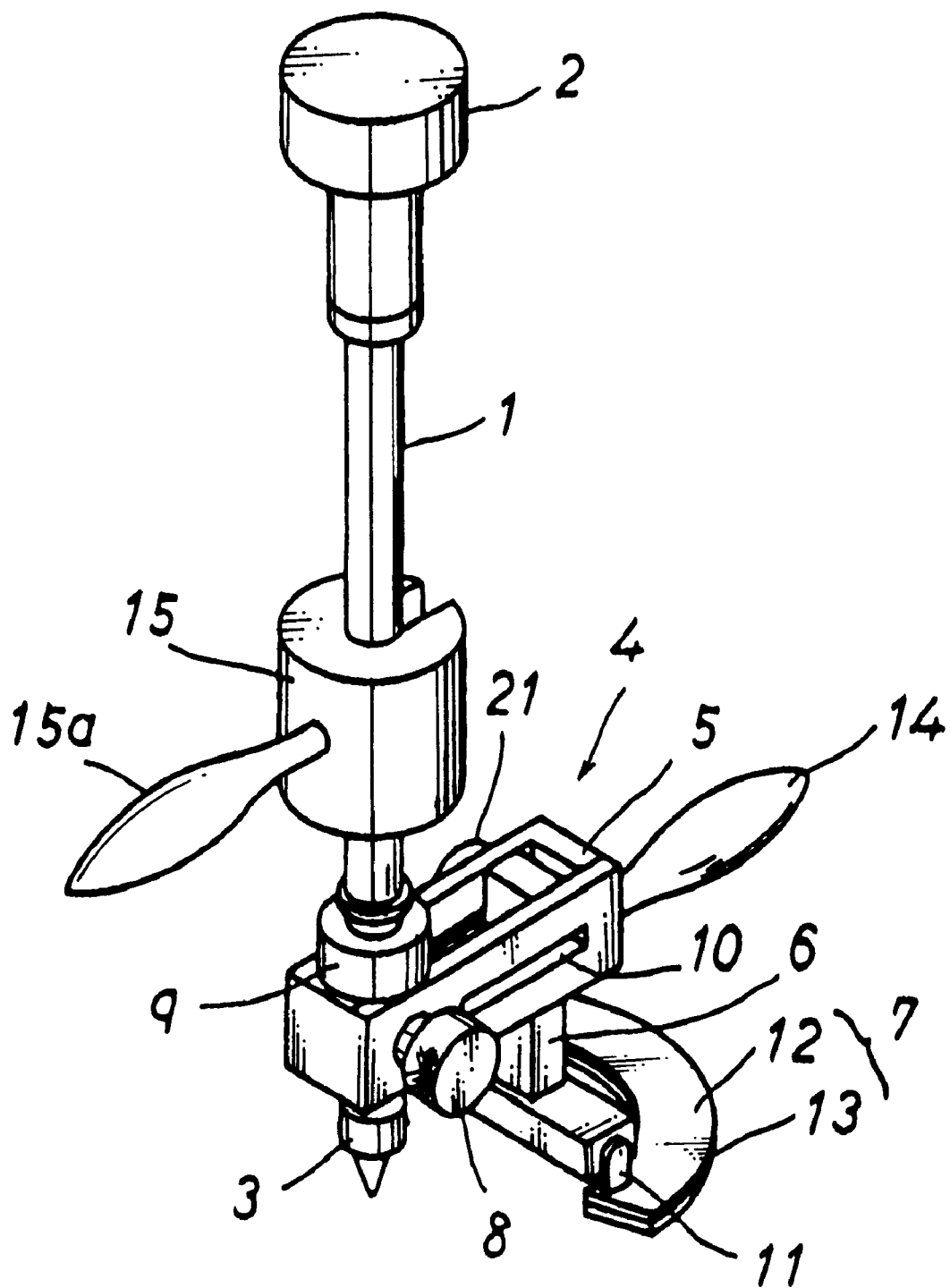
FIG. 1 is a perspective of a preferred example of a sheet metal drawing tool according to the present invention.

Next, embodiments of the present invention are explained in detail hereunder, referring to the drawings.

FIG. 1 is a perspective of a preferred example of a sheet metal drawing tool according to the invention. In FIG. 1, numeral 1 denotes an operation shaft which has an appropriate length ranging, for example, between 300 mm and 500 mm and is made of conductive bar steel or the like. The operation shaft 1 is provided with a handle portion 2 at one end thereof and, at the other end, an arc electrode 3 which is screwed in and thus fastened to the other end. The handle portion 2 is made of a thermoplastic resin or other synthetic resin and fastened to an end of the operation shaft 1. The arc electrode 3 is a tapered shape and fastened to the other end of the operation shaft 1.

Number 4 denotes a support stand disposed at an end of the operation shaft and comprised of a base 5 adapted to secure the operation shaft 1 at an end of the base 5, a leg portion 6 extending from the other end of the base 5 in the direction along the length of the operation shaft 1, and a seat portion 7 provided at the lower end of the leg portion.

The base 5 is a rigid, rectangular frame formed by combining molded metal parts. The operation shaft 1 is inserted through an end portion of the base 5 in such a manner as to be capable of moving along its length and can be fastened at a given location by using a fixing means that consists of a fixing screw 8 and a tightening nut 9. Of the fixing means, the tightening nut 9 is screwed around the operation shaft 9 and serves for preventing the operation shaft from moving downward. The base 5 is provided, near the other end thereof, with elongated holes 10 which are formed opposite each other in the two sides of the base, so that the leg portion 6 can move along the elongated holes 10, in the direction perpendicular to the operation shaft 1.

The leg portion 6 is slidably fitted in the base 5 at the upper end thereof, while the eat portion 7 is so attached to the lower end of the leg portion 6 as to be capable of swinging. The seat portion 7 has an arc-shaped two-layer structure, wherein its upper side is formed of a metal seat plate 12 having brackets 11, and wherein a cushion 13 made of soft resin or a rubber material is affixed to the underside of the seat plate.

Referring to FIG. 1, numerals 14 and 15 respectively denote a handle attached to the base 5 and a slide hammer attached to the operation shaft 1.

Figure 2:
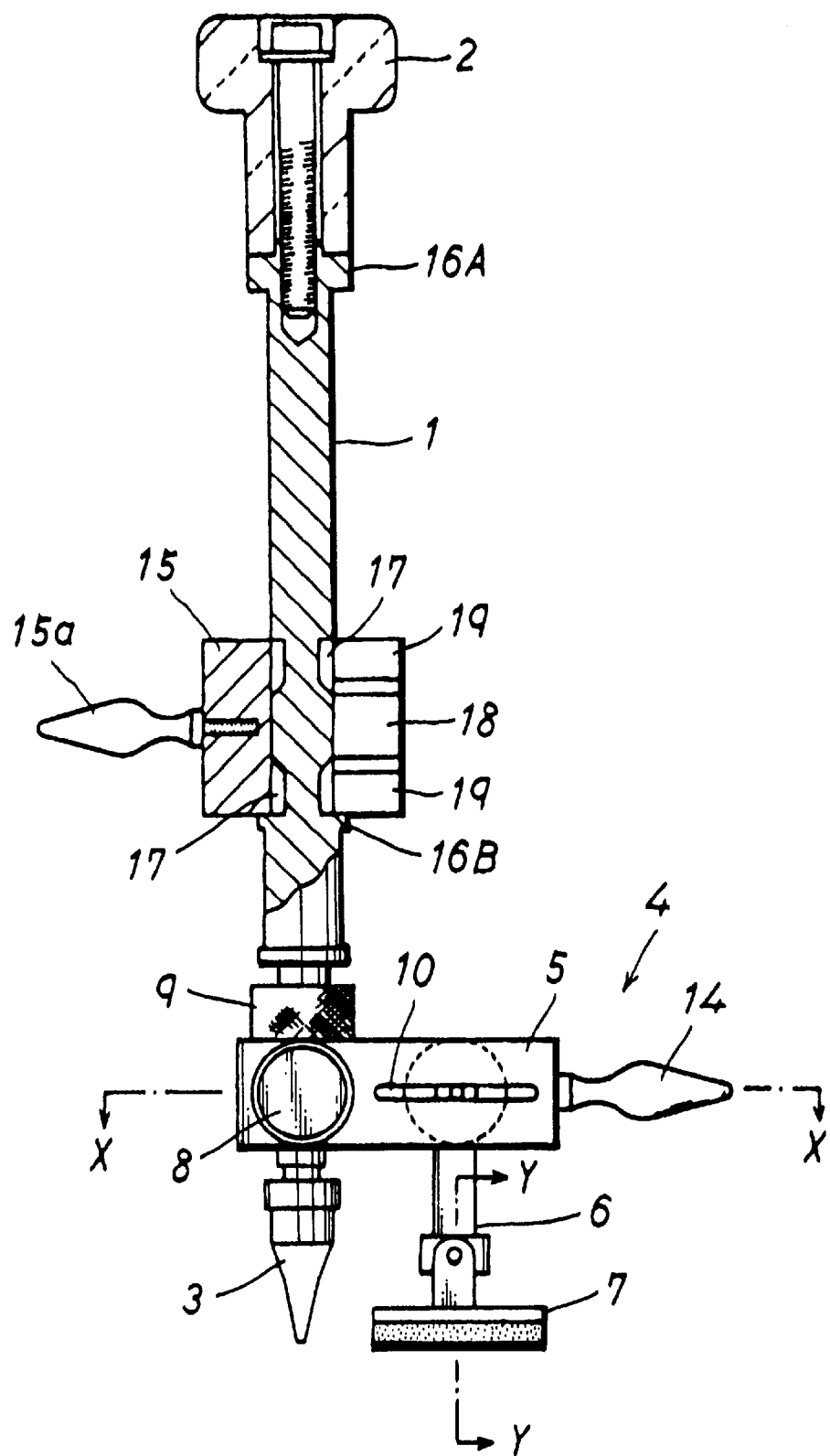
FIG. 2 is a partially cutout side view of said sheet metal drawing tool.

Next, FIG. 2 is a partially cutout view of said tool. As shown in the drawing, brims 16A, 16B are formed on the operation shaft 1 with a given distance between the brims, and the slide hammer 15, which can freely slide in the direction along the length of the operation shaft 1, is fitted between the brims 16A, 16B. Particularly between the brims 16A, 16B, a cutout portion 17 is formed by cutting out a portion of the outer cylindrical surface of the operation shaft 1 so that the slide hammer 15 can be removed or fitted at the location where the cutout portion 17 is formed. FIG. 2 shows the state where the slide hammer 15 is turned by 90° after being fitted around the shaft. In this state, the slide hammer 15 is prevented from being inadvertently removed.

Figure 3:
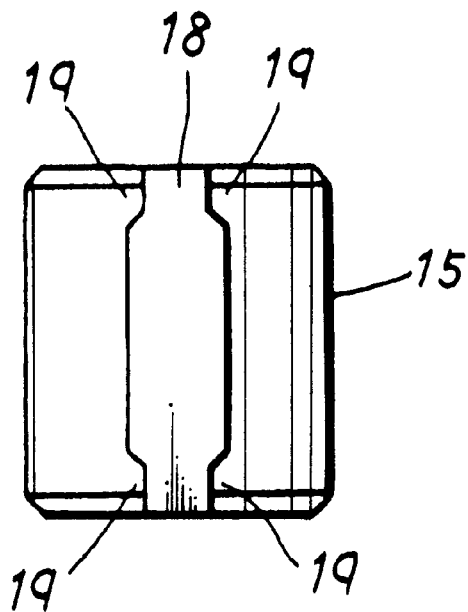
FIG. 3 is a side view of a slide hammer to be attached to an operation shaft.

As it is clearly shown in FIG. 3, the slide hammer 15 is in a cylindrical shape having a vertically extending split slot 18, which is formed in the outer cylindrical surface of the slide hammer 15, and hook portions 19 which are so formed at both sides of the split slot 18, at the upper and the lower ends thereof, as to fit in the cutout portion 17 of the operation shaft 1. When the hook portion 19 are butted against the cutout portion 17 of the operation shaft 1, the slide hammer 15 can be fitted around or removed from the operation shaft 1. When the slide hammer 15 is fitted, by rotating the slide hammer by a specified degree to bring the hook portions 19 to a position where the hook portions do not face the cutout portion 17, the hook portions 19 become engaged with the outer cylindrical face of the operation shaft 1, thereby preventing inadvertent removal of the slide hammer 15.

Figure 8:
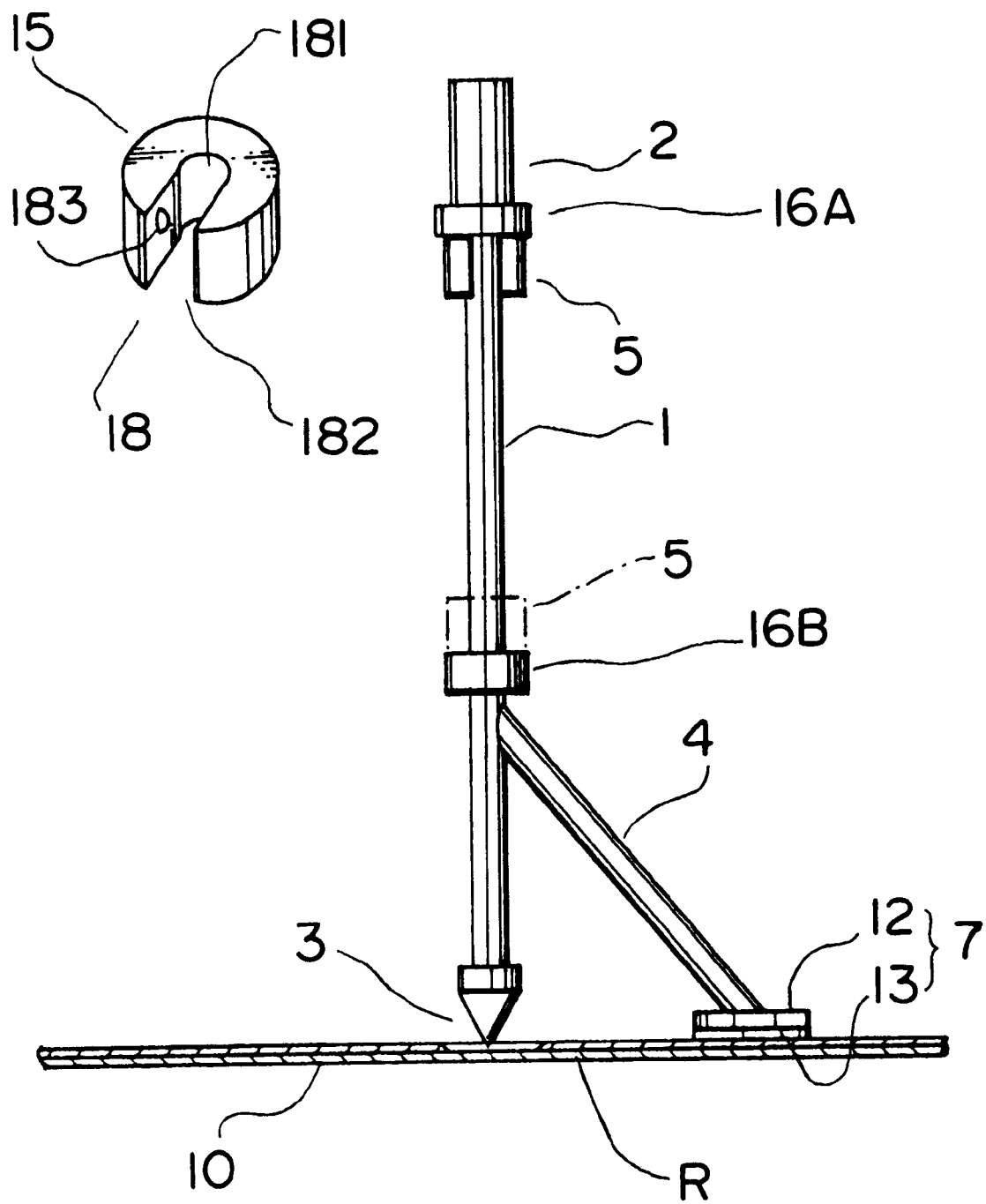
FIG. 8 is a side view of a sheet metal drawing tool according to yet another embodiment of the present invention.
Figure 9:
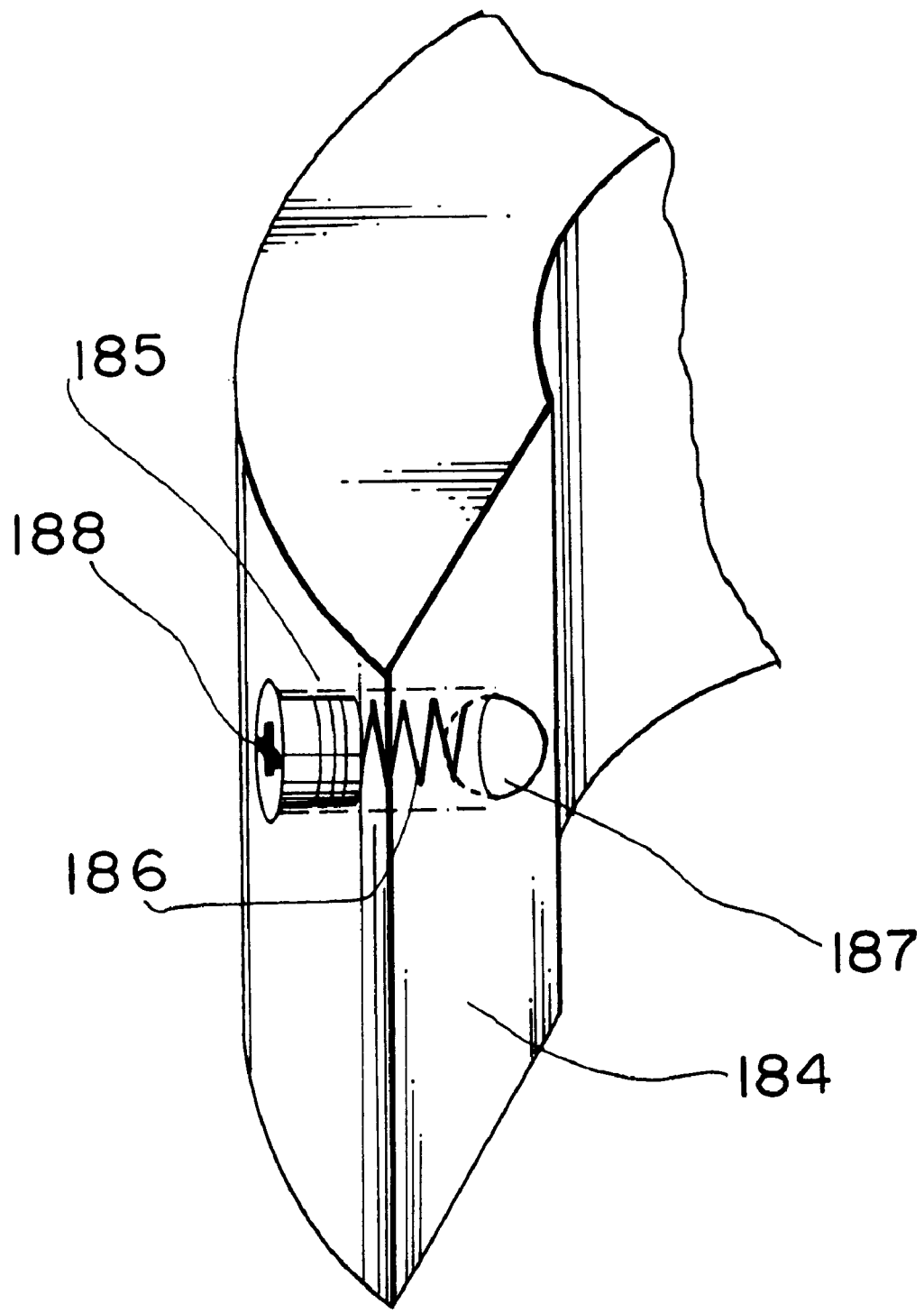
FIG. 9 is a side view of a part of the sheet metal drawing tool shown in FIG. 8.
Figure 10:
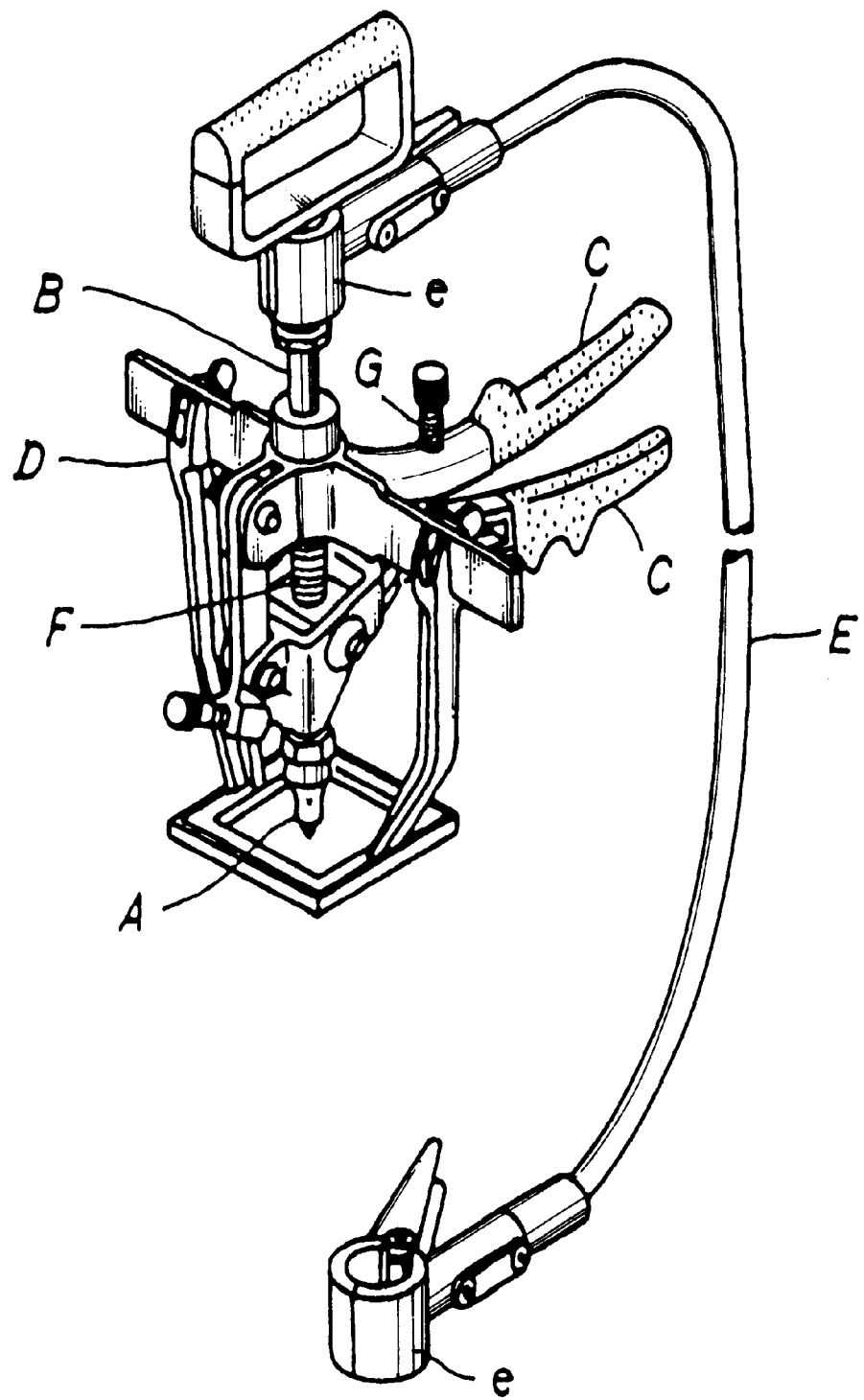
FIG. 10 is a perspective of a conventional sheet metal drawing tool.

The slide hammer 15 may have a structure shown in FIGS. 8 and 9. In this configuration, the slide hammer 15 has a generally cylindrical shape. A split slot 18 adapted to receive the operation shaft 1 is formed in the slide hammer 15 in such a manner that the split slot 18 reaches the center portion 181 of the slide hammer. The split slot 18 comprises the approximately circular center portion 181 of the slide hammer 15 and a slot portion 182 that extends from the outer rim of the circular center portion 181 and permits the operation shaft 1 to be inserted therethrough. The center portion 181 has a diameter slightly greater than that of the operation shaft 1. The center portion 181 does not have to be in a circular shape, and may be in a polygonal shape. The diameter of the center portion 181 may be identical to the width of the slot potion 182. The slot portion 182 is provided with retractable protrusions 183, 183. The protrusions 183, 183 may be desirably comprised of balls 187, each of which is disposed in a through hole 185 bored in a wall 14 of the slot portion 182, with a spring 186 disposed between the outer end of the through hole 185 and the ball 187 so that the ball 187 may be easily projected or retracted. When forming this portion, each through hole 185 may be conveniently bored from the outside of the slide hammer 15, with the portion flush with the surface of the wall 184 being formed smaller than the diameter of the ball 187 or having a frame attached thereto, and then, after the ball 187 and the spring 186 are inserted, the outer end of the through hole may be sealed with a stopper piece 188, which may be a screw or the like. In an alternative structure, each through hole 185 may be formed by boring each respective wall portion 184, and then, after the spring 186 and the ball 187 are disposed in the hole, a push piece or a frame may be pressed against the end of the hole.

Figure 4:
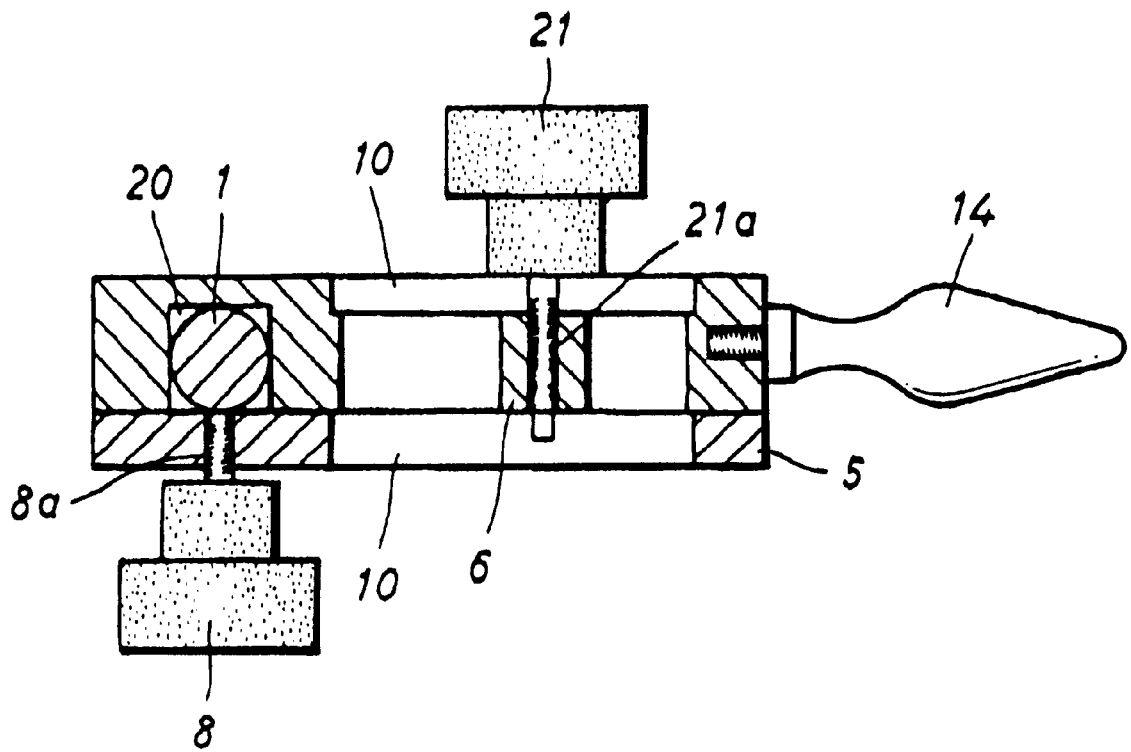
FIG. 4 is a sectional view taken along the line x—x of FIG. 2.

Next, FIG. 4 is a sectional view taken along the line x—x of FIG. 2. As shown in this drawing, a through hole 20 adapted to permit the operation shaft 1 to be inserted therethrough is bored at an end of the base 5 that forms the support stand 4, and the operation shaft 1 is capable of moving in the through hole 20, in the direction along the length of the operation shaft. The threaded shaft 8a of the fixing screw 8 is screwed in a side face of the base 5 toward the through hole 20 so that the lengthwise movement of the operation shaft 1 can be restricted by pushing the tip of the threaded shaft 8a against the outer cylindrical surface of the operation shaft 1.

Further, at the other side of the base 5, the threaded shaft 21a of a fixing screw 21 is disposed in the elongated hole 10 and screwed in the upper end of the leg portion 6. The threaded shaft 21a is inserted from one of the elongated holes 10, pierces through the leg portion 6 and reaches the other elongated hole 10 so that the leg portion 6 can move along the elongated holes 10 when the threaded portion 21a is loose and positioned at a specified location and secured there by tightening the fixing screw 21. The other side of the base 5, where the elongated holes 10 are provided, may be formed of a single plate and, therefore, have only a single elongated hole 10.

Figure 5:
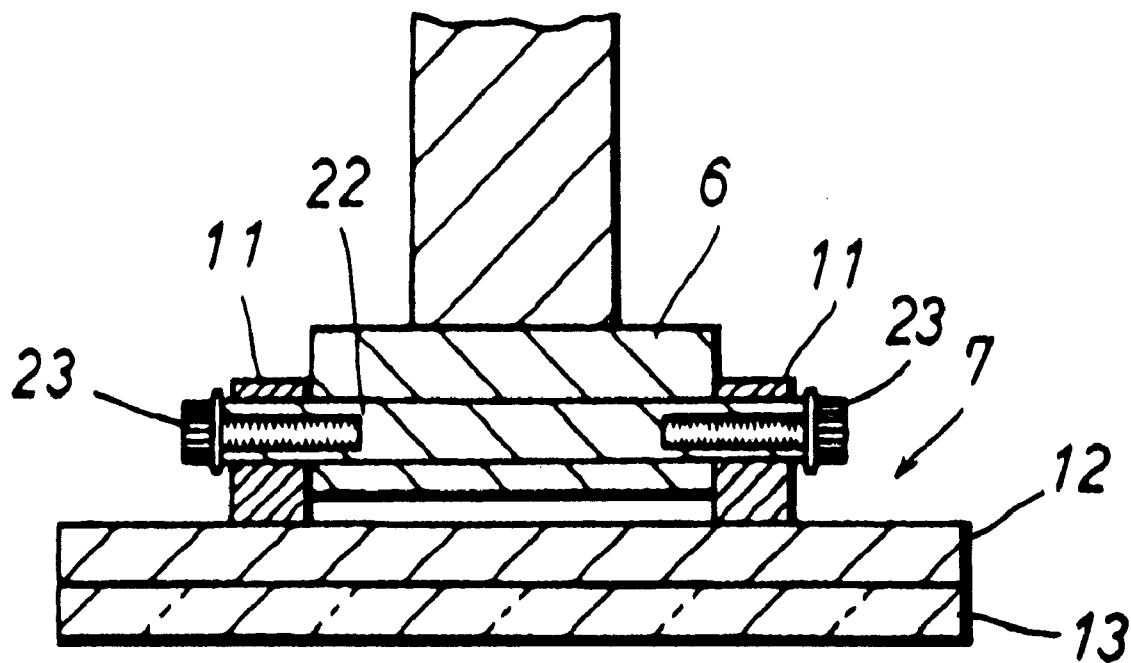
FIG. 5 is a sectional view taken along the line y—y of FIG. 2.

Next, FIG. 5 is a sectional view taken along the line y—y of FIG. 2. As shown in this drawing, the seat portion 7 can be attached by sandwiching the lower end of the leg portion 6 with the brackets 11 that project from the seat plate 12 of the seat portion 7, piercing a pin 22 through the brackets 11 with the leg portion 6 therebetween, and screwing collar head bolts 23 respectively from both ends of the brackets 11 into the pin. Therefore, the seat portion 7 is capable of swinging around the pin 22.

Now, in order to repair a dented portion of a sheet metal, such as, for example, the body of an automobile, with a sheet metal drawing tool having a structure described above, first, the height of the arc electrode 3 and the position of the seat portion 7 are adjusted in accordance with the depth and the size of the dented portion, and the arc electrode 3 and seat portion 7 are then secured at given portions.

The height of the arc electrode 3 can be adjusted by loosening the fixing screw 8 and the tightening nut 9, moving the operation shaft 1 in the direction along its length and then tightening the fixing screw 8 and the tightening nut 9, thereby securing them at an appropriate location. The position of the seat portion 7 is adjusted by loosening the fixing screw 21.

Next according to a conventional example, the operation shaft 1 and a power supply portion of a welding machine (not shown) are connected together via a cable E shown in FIG. 8. To be more specific, the operation is done by connecting one of the two clamps e,e, which are respectively provided at the two ends of the cable E, to an electrode extended from a power supply portion of the welding machine and attaching the other clamp to the outer cylindrical surface of the operation shaft 1.

Figure 6:
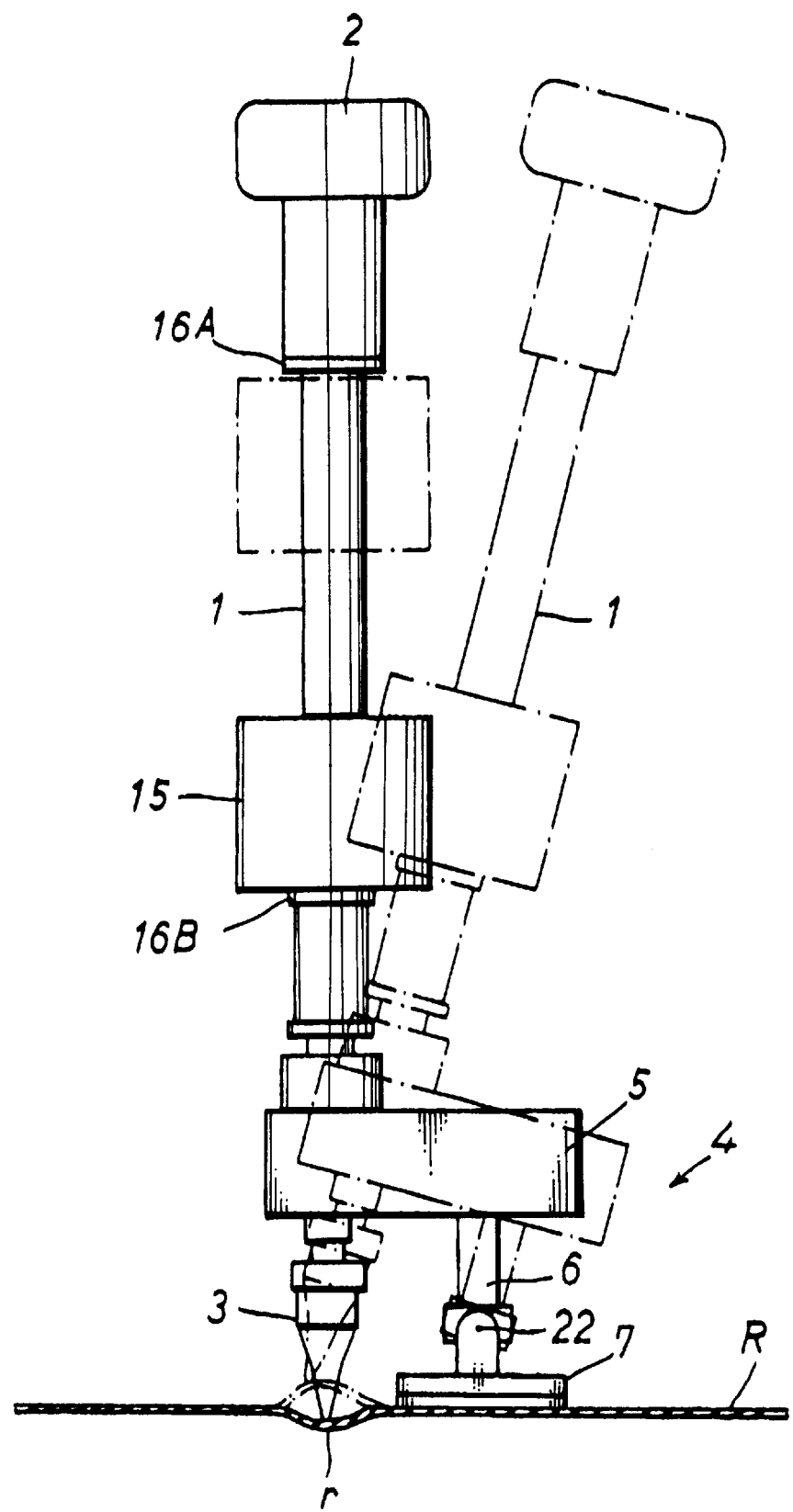
FIG. 6 is a side view showing an example of the state where said sheet metal drawing tool is used.

Then, as shown in FIG. 6, the seat portion 7 is brought into contact with the surface R of the sheet metal at the location around the dented portion r, and, in that state, the operation shaft 1 is swung around the pine 22, i.e. the portion where the leg portion 6 of the support stand 4 is in contact with the seat portion 7, until the tip of the arc electrode 3 touches the dented portion r. As a result, arc current flows from the arc electrode 3 to the sheet metal surface R, and the arc electrode 3 and the dented portion r of the sheet metal are welded together. Then, the operation shaft 1 is gradually tilted toward the seat portion 7 while the seat portion 7 is pushed against the sheet metal surface R. Thus, the dented portion r joined to the arc electrode 3 is pulled out, because a leverage force acts on the dented portion r, with the portion of the seat portion 7 where the pin 22 is located serving as the fulcrum and the handle portion 2 of the operation shaft 1 as the point of force.

As described above, a tool under the present application makes use of leverage and is therefore capable of pulling out a dented portion r of a sheet metal with a minimal force. In addition, as the underside of the seat portion 7 adapted to come into contact with a sheet metal is formed of a cushion 13, there is no danger of causing a damage on the surface of the sheet metal during the repairing operation. After the dented portion 4 has been pulled out, the sheet metal and the arc electrode can be detached from each other by loosening the fixing screw 8 and rotating the operation shaft 1 around its axis.

In addition, instead of the repairing method described above, a tool under the present application may be applied to an impact operation by using the slide hammer 15. In that case, the slide hammer 15 is attached to the operation shaft 1, and then, in the state where the arc electrode 3 is welded to a dented portion r of a sheet metal, the slide hammer 15 is slid in the direction along the length of the operation shaft 1 by holding the handle 15a. As a result, the impact of the slide hammer 15 abutting against the brim 16A pulls out the dented portion.

When attaching the slide hammer 15 shown in FIGS. 8 and 9 to the operation shaft 1, the split slot 18 of the slide hammer 15 is brought into contact with the operation shaft 1 from a side, and the slide hammer 15 is pushed in the direction of the operation shaft 1 so that the operation shaft 1 moves in the slot portion 182 and comes into contact with the protrusions 183,183. When the slide hammer is pushed further, the protrusions 183,183, being pushed by the operation shaft 1, pushes the springs 186 and retreats into the respective through holes 185, thereby permitting the operation shaft 1 to move through the slot portion 182 and reach the center portion 181. When the operation shaft 1 has passed the protrusions 183,183, the protrusions 183,183 project again into the slot portion 182 because of the pushing force of the springs 186. Under normal circumstances, the operation shaft 1 remains in the center portion 181. When the slide hammer 15 is being vertically moved along the operation shaft 1, the operation shaft 1 is located in the center portion 181 of the slide hammer 15. The slide hammer 15 can be removed from the operation shaft 1 by reversing the above process, in other words removing the operation shaft 1 from the slot portion 182 while pushing the protrusions 183,183 by means of the operation shaft 1.

Although a preferred embodiment of the present invention has been described, a tool under the present application is not limited to the structure described above; for example, a structure which calls for affixing an end of the operation shaft 1 to the top of the base 5, providing a threaded shaft or the like that projects from the underside of the base 5, and attaching the arc electrode 3 to said threaded shaft in such a manner that the height of the arc electrode can be adjusted is also applicable. Furthermore, the leg portion 6 and/or the seat portion 7 of the support stand may be affixed instead of being movably disposed.

Figure 7:
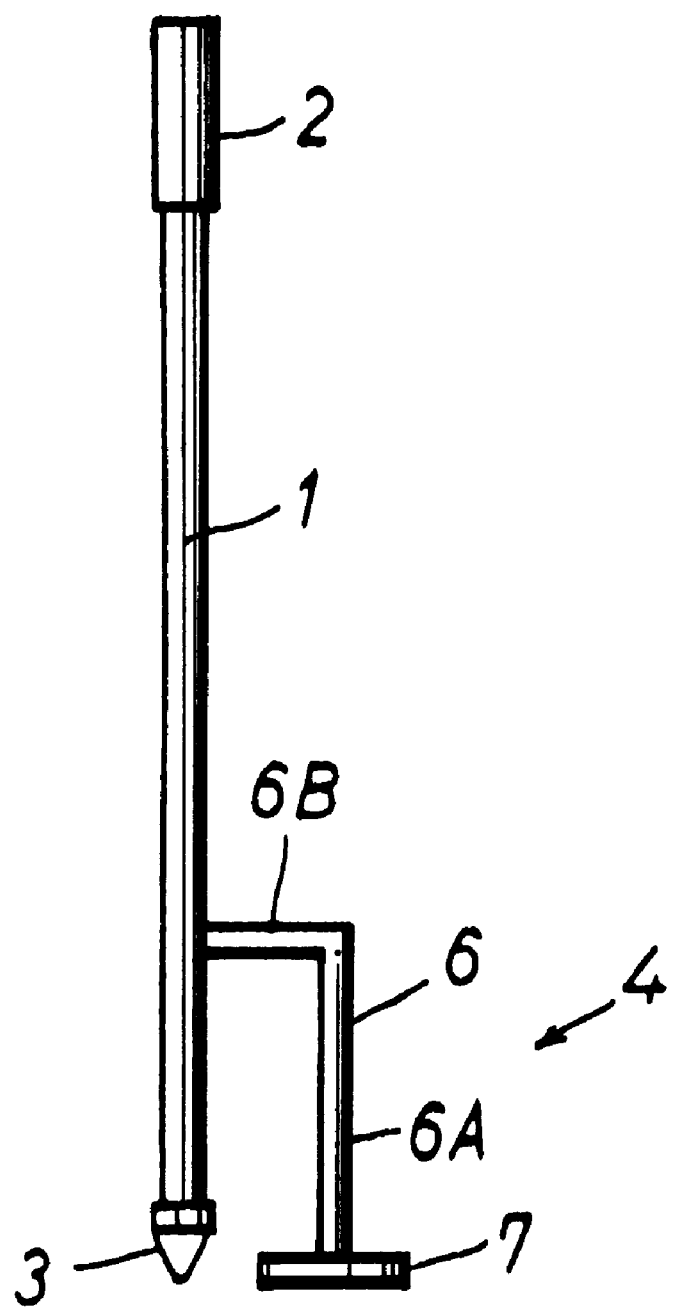
FIG. 7 is a schematic side view of a sheet metal drawing tool according to another embodiment of the present invention.

Of such structures that call for providing a fixed leg portion and/or a fixed seat portion, one of the most simple examples is shown in FIG. 7, wherein a sheet metal drawing tool includes a support stand 4 which is formed by affixing a leg portion 6 in the shape of an inverted L to an operation shaft 1 and affixing a seat portion 7 to the lower end of the leg portion 6 in the state where the lower end of the leg portion 6 is nearly flush with the arc electrode 3 of the operation shaft 1. However, the seat portion 7 may be swingably attached to the lower end of the leg portion 6 in the otherwise same configuration. Other examples of applicable configurations include one which calls for attaching a cylindrical metal fitting on the upper end of the leg portion 6 and inserting the operation shaft 1 through the fitting so that the operation shaft and the support stand can be moved relative to each other in the direction along the length of the operation shaft and another configuration wherein the vertical portion 6A of the leg portion 6 is made of an extendable shaft having a fixing means so that the arc electrode 3 can be adjusted to a position corresponding to the depth of a dented portion of a sheet metal.

Furthermore, the horizontal portion 6B of the leg portion 6 may be formed of an extendable shaft having a fixing means so that the leg portion 6 can be moved in the direction perpendicular to the operation shaft 1.

As it is evident from the above explanation, because of the configuration wherein a support stand having a seat portion is attached to an operation shaft that has at one end thereof an arc electrode so that the portion of the sheet metal that is joined to the arc electrode can be pulled out by tilting the operation shaft while pushing the seat portion against the surface of the sheet metal, the present invention has a simple configuration and at the same time is capable of properly pulling out and repairing a target portion of a sheet metal. In addition, as the dented portion can be pulled out by application of a minimal force by leverage, the invention is also capable of alleviating a burden imposed on the operator and substantially increasing the working efficiency.

Furthermore, as the operation shaft and the support stand can be moved relative to each other along the length of the operation shaft, the invention permits a configuration wherein an arc electrode is provided at an end of the operation shaft and wherein the position of the arc electrode can be adjusted in accordance with the depth of a dented portion of a sheet metal. In addition, as the leg portion which forms the support stand can be moved in the direction perpendicular to the operation shaft, the position of the seat portion can be adjusted in accordance with the side of a dented portion.

By swingably attaching the seat portion to the lower end of the leg portion so that the operation shaft can be tilted in the state where the entire surface of the seat portion is in close contact with the surface of a sheet metal, the invention improves stability of the operation shaft during an operation, thereby making the operation shaft more convenient to handle. Furthermore, the entire surface of the underside of the seat portion comes into contact with the surface of a sheet metal. By thus increasing the area of contact, the stress applied to the surface of the sheet metal can be distributed. Therefore, by eliminating the danger of the seat portion applying an excessive pressure to a part of a metal sheet when the operation shaft is tilted, the invention is capable of preventing breakage of such a part.

As the seat portion is formed in the shape of an arc, a sufficient distance is provided between the seat portion and the arc electrode that may be at the end of the operation shaft. With the operation range being thus expanded, the invention is not restricted to a limited operation range but is capable of handling various areas on a sheet metal. In addition, as the area where the seat portion is in contact with the surface of a sheet metal is increased so that the pressure applied to the sheet metal is widely distributed, the invention is capable of protecting the sheet metal from undesirable influence of the operation force.

As the operation shaft is provided with a slide hammer, it is possible to select an operation method according to conditions of damages of the sheet metal or other criteria. Therefore, the invention presents the benefit of the tool becoming substantially more convenient.

We claim:

1. A sheet metal drawing tool including:
    An operation shaft having an end that serves as a handle portion and the other end that is provided with an arc electrode adapted to be welded to a portion of sheet meal;
    and a support stand attached to the operation shaft, wherein:
        said support stand has a seat portion which is located near the arc electrode and adapted to be brought into contact with the surface of a sheet metal so that the portion of the sheet metal that is joined to the arc electrode is pulled out by tilting the operation shaft relative to the seat portion while the seat portion pushes against the surface of the sheet metal.

2. A sheet metal drawing tool including an operation shaft and a support stand attached to the operation shaft, wherein:
    said operation shaft has an end that serves as a handle portion and the other end affixed to a part of said support stand;
    said support stand is comprised of a base for securing said operation shaft at one end thereof, a leg portion extended from the other end of the base along the operation shaft, and a seat portion provided at the lower end of the leg portion;
    either the operation shaft or the base is provided with an arc electrode which is located near said seat portion and adapted to be welded to a portion of a sheet metal; and
    the portion of the sheet metal that is joined to the arc electrode is pulled out by tilting the operation shaft relative to the seat portion while the seat portion pushes against the surface of the sheet metal.

3. A sheet metal drawing tool as claimed in claim 1, wherein the operation shaft and the support stand can be moved relative to each other along the length of the operation shaft.

4. A sheet metal drawing tool as claimed in claim 2, wherein said leg portion of said support stand is moved in a direction perpendicular to said operation shaft.

5. A sheet metal drawing tool as claimed in claim 2, wherein said seat portion is comprised of a seat plate having a top side and an underside, a cushion attached to the underside of said seat plate and a pair of parallel spaced brackets extending vertically upward from said top side of said seat plate and having a transverse aperture extending therethrough, and wherein said leg portion of said support stand has a lower end provided with a transverse bore extending therethrough, and wherein said seat portion is switchably attached to said leg portion of said support stand by sandwiching said lower end of said leg portion between said pair of brackets so that said transverse bore in said lower end of said leg portion is in axial alignment with said transverse aperture in said brackets and by inserting a pin-like member through said bore and said apertures and screwing a threaded fastening means into a pair of threaded bores provided in the opposing ends of said pin-like member.

6. A sheet metal drawing tool as claimed in claim 2, wherein said seat portion is formed in the shape of an arc.

7. A sheet metal drawing tool as claimed in claim 1, wherein a plurality of brims are formed on said operation shaft, with a predetermined distance between said brims; and a slide hammer is attached to the portion between said brims in such a manner that said slide hammer is capable of sliding in the direction along the length of said operation shaft when said operation shaft is tilted relative to the seat portion.

8. A sheet metal drawing tool as claimed in claim 7 wherein:

said slide hammer is provided with a space through which said operation shaft is capable of moving and is capable of sliding along said operation shaft; and the sheet metal drawing tool includes protrusions which are capable of protruding into and retreating from said space so that the slide hammer can be removably attached to and supported by the operation shaft.

9. A method of repairing sheet metal by using a sheet metal drawing tool which includes:

providing said tool with an operation shaft having an end that serves as a handle portion and the other end provided with an arc electrode adapted to be welded to a portion of a sheet metal; and a support stand attached to the operation shaft, said support stand having a seat portion which is located near said arc electrode and adapted to be brought into contact with the surface of said sheet metal; wherein:

the portion of the sheet metal that is joined to the arc electrode is pulled out by tilting the operations shaft relative to the seat portion while the seat portion pushes against the surface of the sheet metal.

10. A sheet metal drawing tool as claimed in claim 1, wherein said support stand further comprises a base for securing said operation shaft at one end thereof, a leg portion extending from said base and a seat portion attached to said leg portion.

11. A sheet metal drawing tool as claimed in claim 10, wherein said seat portion is formed in the shape of an arc.

12. A sheet metal drawing tool as claimed in claim 2, wherein a plurality of brims are formed on said operation shaft, with a predetermined distance between said brims; and a slide hammer is attached to the portion between said brims in such a manner that said slide hammer is capable of sliding in the direction along the length of said operation shaft when said operation shaft is tilted relative to the seat portion.

13. A sheet metal drawing tool as claimed in claim 12 wherein:

said slide hammer is provided with a space through which said operation shaft is capable of moving and is capable of sliding along said operation shaft; and the sheet metal drawing tool includes protrusions which are capable of protruding into and retreating from said space so that the slide hammer can be removably attached to and supported by the operation shaft.

* * * * *